(12) United States Patent
Korsch et al.

(10) Patent No.: US 11,753,073 B2
(45) Date of Patent: Sep. 12, 2023

(54) SYSTEMS AND METHODS FOR PROVIDING A VEHICLE WITH A FRONT DIG MODE

(71) Applicant: RIVIAN IP HOLDINGS, LLC, Irvine, CA (US)

(72) Inventors: Steven Korsch, Jackson, MI (US); Mason Verbridge, Canton, MI (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/840,352

(22) Filed: Jun. 14, 2022

(65) Prior Publication Data

US 2022/0306194 A1    Sep. 29, 2022

Related U.S. Application Data

(63) Continuation of application No. 16/682,856, filed on Nov. 13, 2019, now Pat. No. 11,390,322.

(60) Provisional application No. 62/760,610, filed on Nov. 13, 2018.

(51) Int. Cl.
*B62D 9/00* (2006.01)
*B60K 26/02* (2006.01)
*B62D 11/04* (2006.01)
*B60W 10/04* (2006.01)

(52) U.S. Cl.
CPC .............. *B62D 9/002* (2013.01); *B60K 26/02* (2013.01); *B60W 10/04* (2013.01); *B62D 11/04* (2013.01)

(58) Field of Classification Search
CPC ......... B60W 10/04; B62D 11/04; B62D 9/002
See application file for complete search history.

(56) References Cited

U.S. PATENT DOCUMENTS

| | | | | |
|---|---|---|---|---|
| 6,588,858 B2 * | 7/2003 | Ritz | ...................... | B62D 11/08 303/140 |
| 7,703,561 B2 * | 4/2010 | Miyajima | .............. | B62D 11/24 180/407 |
| 7,712,845 B2 * | 5/2010 | Mackovjak | ............ | B62D 11/24 303/147 |

(Continued)

FOREIGN PATENT DOCUMENTS

| | | |
|---|---|---|
| CN | 106314427 A | 1/2017 |
| CN | 112424011 A | 2/2021 |

(Continued)

OTHER PUBLICATIONS

International Search Report and Written Opinion received for PCT Patent Application No. PCT/US2019/061260, dated Feb. 21, 2020, 10 pages.

*Primary Examiner* — Kevin Hurley
*Assistant Examiner* — Hosam Shabara
(74) *Attorney, Agent, or Firm* — Haley Guiliano LLP

(57) ABSTRACT

Systems and methods are provided herein for operating a vehicle in a front dig mode. The front dig mode is engaged in response to determining that speed of the vehicle is below a speed threshold and determining that the amount that at least one of the front wheels of the vehicle is turned exceeds a turn threshold. While operating in the front dig mode, forward torque is provided to the front wheels of the vehicle. Further, resistance is applied to forward rotation of the inner back wheel of the vehicle. Yet further, forward torque is provided to the outer back wheel of the vehicle.

20 Claims, 6 Drawing Sheets

(56) References Cited

U.S. PATENT DOCUMENTS

| | | | |
|---|---|---|---|
| 8,701,801 B2 * | 4/2014 | Itou | B62D 7/1509 |
| | | | 180/234 |
| 9,393,993 B2 * | 7/2016 | Nishikawa | B60W 30/09 |
| 9,487,232 B2 | 11/2016 | Ohmura et al. | |
| 10,155,514 B2 | 12/2018 | Rycroft | |
| 10,759,282 B2 | 9/2020 | Suzuki | |
| 10,933,875 B2 * | 3/2021 | Suzuki | B60W 30/045 |
| 11,390,322 B2 * | 7/2022 | Korsch | B60W 30/18109 |
| 2002/0060103 A1 | 5/2002 | Ritz et al. | |
| 2009/0054202 A1 * | 2/2009 | Yamakado | B60K 6/52 |
| | | | 477/6 |
| 2010/0174463 A1 | 7/2010 | Uragami et al. | |
| 2014/0305715 A1 * | 10/2014 | Makino | B60K 17/358 |
| | | | 180/6.24 |
| 2016/0318509 A1 | 11/2016 | Rycroft | |
| 2018/0304768 A1 | 10/2018 | Suzuki | |
| 2020/0148255 A1 | 5/2020 | Korsch et al. | |
| 2021/0309114 A1 * | 10/2021 | Nordmann | B60K 6/52 |
| 2021/0402982 A1 * | 12/2021 | Verbridge | B60T 8/1755 |

FOREIGN PATENT DOCUMENTS

| | | | | |
|---|---|---|---|---|
| FR | 2851219 A1 | | 8/2004 | |
| GB | 2345895 A | * | 7/2000 | B60K 6/46 |
| GB | 2358004 A | | 7/2001 | |
| WO | 2004/106101 A1 | | 12/2004 | |
| WO | WO-2004106101 A1 | * | 12/2004 | B60K 17/356 |
| WO | 2020/216538 A1 | | 10/2020 | |
| WO | WO-2020216538 A1 | * | 10/2020 | B60L 15/36 |

\* cited by examiner

SYSTEMS AND METHODS FOR PROVIDING A VEHICLE WITH A FRONT DIG MODE

CROSS-REFERENCE TO RELATED APPLICATIONS

This application is a continuation of U.S. patent application Ser. No. 16/682,856, filed Nov. 13, 2019, which claims the benefit of U.S. Provisional Application No. 62/760,610, filed Nov. 13, 2018, which are hereby incorporated by reference herein in their entireties.

BACKGROUND

Modern vehicles generally perform turns simply by allowing the driver to turn the front wheels of the vehicle (e.g., by turning the steering wheel) and applying torque to at least two wheels (e.g., in response to the user pressing a gas pedal). However, such turns typically have a relatively large turn radius defined by layout of the wheels and how far the wheels can turn. Such turns do not allow for navigation of tight corners. Consequently, what is needed is improved turning capability that enable turns with decreased turn radius.

SUMMARY

In accordance with the present disclosure, systems and methods are provided that improve the operation of a vehicle by providing a front dig mode and a tank-turn mode to allow the vehicle to achieve a decreased turn radius. For example, a system may utilize improved features of a vehicle (e.g., independent controls of front and back drive shafts, independent controls of the wheels, independent controls of the brakes, etc.) to provide a vehicle with a capability of performing turns with a decreased turn radius.

In some implementations, techniques described below may be performed by processing circuitry of a vehicle. The processing circuitry may be implemented as a part of a vehicle. In some embodiments, the processing circuitry may comprise an on-board vehicle computer that can control multiple features or capabilities of the vehicle. In some embodiments, the processing circuitry may be communicatively connected with user inputs of the vehicle, sensors of the vehicle, and transitory or non-transitory memory (e.g., memory-storing institutions for operating the vehicle).

In some embodiments, a method for turning a vehicle in a front dig mode is provided. For example, the processing circuitry may engage the front dig mode of the vehicle under certain circumstances. In some embodiments, the processing circuitry may engage the front dig mode after the user issues a command requesting such mode (e.g., by pressing an approximate button, turning the steering wheel past a certain point, or via any other input).

In some embodiments, the processing circuitry may engage the front dig mode by monitoring the speed of the vehicle and by monitoring how far the front wheels of the vehicle are turned (e.g., by determining a turn angle of the front wheels). For example, the processing circuitry may determine that the speed of the vehicle is below a speed threshold (e.g., 5 miles per hour, or any other speed). In some examples, the processing circuitry may also determine that the amount that at least one of the front wheels of the vehicle is turned exceeds a turn threshold (e.g., 45%, 40%, or any other turn threshold). In some embodiments, when both criteria are met, the processing circuitry may activate the front dig mode.

In some embodiments, while operating in front dig mode, the processing circuitry may provide forward torque to the front wheels of the vehicle. In some embodiments, forward torque may be provided in proportion to the user input (e.g., proportionally to how far the user has pressed the gas pedal). In some embodiments, the processing circuitry may also apply resistance to forward rotation of the inner back wheel of the vehicle. For example, the processing circuitry may engage a brake connected to the inner back wheel of the vehicle. In another example, the processing circuitry may provide backward torque to the inner back wheel of the vehicle. In some embodiments, the processing circuitry may also provide forward torque to the outer back wheel of the vehicle. As a result of operating in the front dig mode, the vehicle will perform a turn with a reduced turn radius.

In some embodiments, the processing circuitry may determine that the amount that at least one of the front wheels of the vehicle is turned exceeds a turn threshold by determining that the steering wheel of the vehicle is turned past a first threshold. For example, if the steering wheel of the vehicle is rotated by more than 2.5 full revolutions, the processing circuitry may determine that the amount that at least one of the front wheels of the vehicle is turned (e.g., 40% degrees, which corresponds to the 2.5 full revolutions of the wheel) exceeds a turn threshold.

In some embodiments, the processing circuitry, in response to determining that the steering wheel of the vehicle is turned past a first threshold, may apply a brake to the inner back wheel of the vehicle (e.g., as part of the front dig mode).

In some embodiments, the processing circuitry may subsequently determine that the steering wheel of the vehicle is turned past a second threshold (e.g., 3 revolutions), which is greater than the first threshold (e.g., 2.5 revolutions). For example, the processing circuitry may determine that the steering wheel of the vehicle is rotated by more than 3 full revolutions (which may correspond to 45% rotation of the front wheels.) In some embodiments, the processing circuitry may then apply backward torque to the inner back wheel of the vehicle (e.g., as part of the front dig mode).

In some embodiments, the processing circuitry, while operating in front dig mode, may determine that the steering wheel of the vehicle is turned past a second threshold (e.g., 3 revolutions), that is greater than the first threshold (e.g., 2.5 revolutions). In response, the processing circuitry may engage a tank-turn mode. While operating in the tank-turn mode, the processing circuitry may provide forward torque to the front outside wheel of the vehicle and back outside wheel of the vehicle and provide backward torque to the front inside wheel of the vehicle and back inside wheel of the vehicle. As a result of operation in the tank-turn mode, the vehicle will turn with an even more significantly reduced turn radius (e.g., the vehicle may pivot around a point under the chassis of the vehicle).

In some embodiments, the vehicle may comprise two different motors. For example, a first motor may be capable of providing torque (forward and backward) to the front drive shaft of the vehicle, and a second motor may be capable of providing torque (forward and backward) to the back drive shaft of the vehicle. In some embodiments, while operating in front dig mode, the processing circuitry may provide forward torque to a front drive shaft of the vehicle using the first motor. The processing circuitry may also provide forward torque to a back drive shaft of the vehicle by using the second motor. In this example, the processing circuitry may apply brakes to the inner back wheel of the vehicle as a part of front dig mode operation.

In some embodiments, an individual motor may be provided for each wheel of the vehicle. For example, a first motor may be capable of providing torque (forward and backward) to the outer back wheel of the vehicle, and a second motor may be capable of providing torque (forward and backward) to the inner back wheel. In some embodiments, while operating in front dig mode, the processing circuitry may provide forward torque to the outer back wheel of the vehicle using the first motor. In some embodiments, the processing circuitry may also apply resistance to the inner back wheel of the vehicle by applying backward torque to the inner back wheel using a second motor.

In some embodiments, while operating in the front dig mode, the processing circuitry may determine that a differential of the back drive shaft of the vehicle is closed. In some embodiments, the processing circuitry may then open the differential of the back drive shaft of the vehicle to ensure that the differential of the back drive shaft is open during the operation of the front dig mode.

In some embodiments, the processing circuitry may be configured to disengage the front dig mode. For example, the processing circuitry may determine that the speed of the vehicle is above the speed threshold. In some embodiments, the processing circuitry may also determine that the amount that at least one of the front wheels of the vehicle is turned is below the turn threshold. In some embodiments, when both determinations are made, the processing circuitry may automatically disengage the front dig mode. In some embodiments, the processing circuitry may disengage the front dig mode in response to receiving user input (e.g., a key being pressed, or the steering wheel being turned to a position that does not exceed a threshold).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

DETAILED DESCRIPTION

The present disclosure is directed to operating a vehicle in a front dig mode. In some embodiments, the front and back drive shafts of the vehicle may be independently controlled. In some embodiments, the vehicle may be configured, when certain conditions are met (e.g., when the speed of the vehicle is low enough and when the front wheels are turned far enough), to operate in the front dig mode. In some embodiments, while operating in the front dig mode, the vehicle is configured such that forward torque is provided to the front wheels of the vehicle and to the outer back wheel of the vehicle. At the same time, a resistance (e.g., braking or backwards torque) is provided to the inner back wheel of the vehicle. The front dig mode allows a vehicle to turn with a reduced turn radius.

As referred to herein, the term "inner wheel" refers to a wheel that is closer to the direction of a turn of the vehicle. For example, during a right turn, the right wheels of the vehicle may be considered "inner wheels," while the left wheels of the vehicle may be considered "outer wheels." In another example, during a left turn, the left wheels of the vehicle may be considered "inner wheels," while the right wheels of the vehicle may be considered "outer wheels."

As referred to herein, the term "front dig mode" refers to any kind of a mode or technique for operating a vehicle such that a resistance is applied to forward rotation of the inner back wheel of the vehicle.

As referred to herein, the term "tank-turn mode" refers to any kind of a mode or technique for operating a vehicle such that left and right wheels of the vehicle are rotated in opposite directions.

Figure 1:
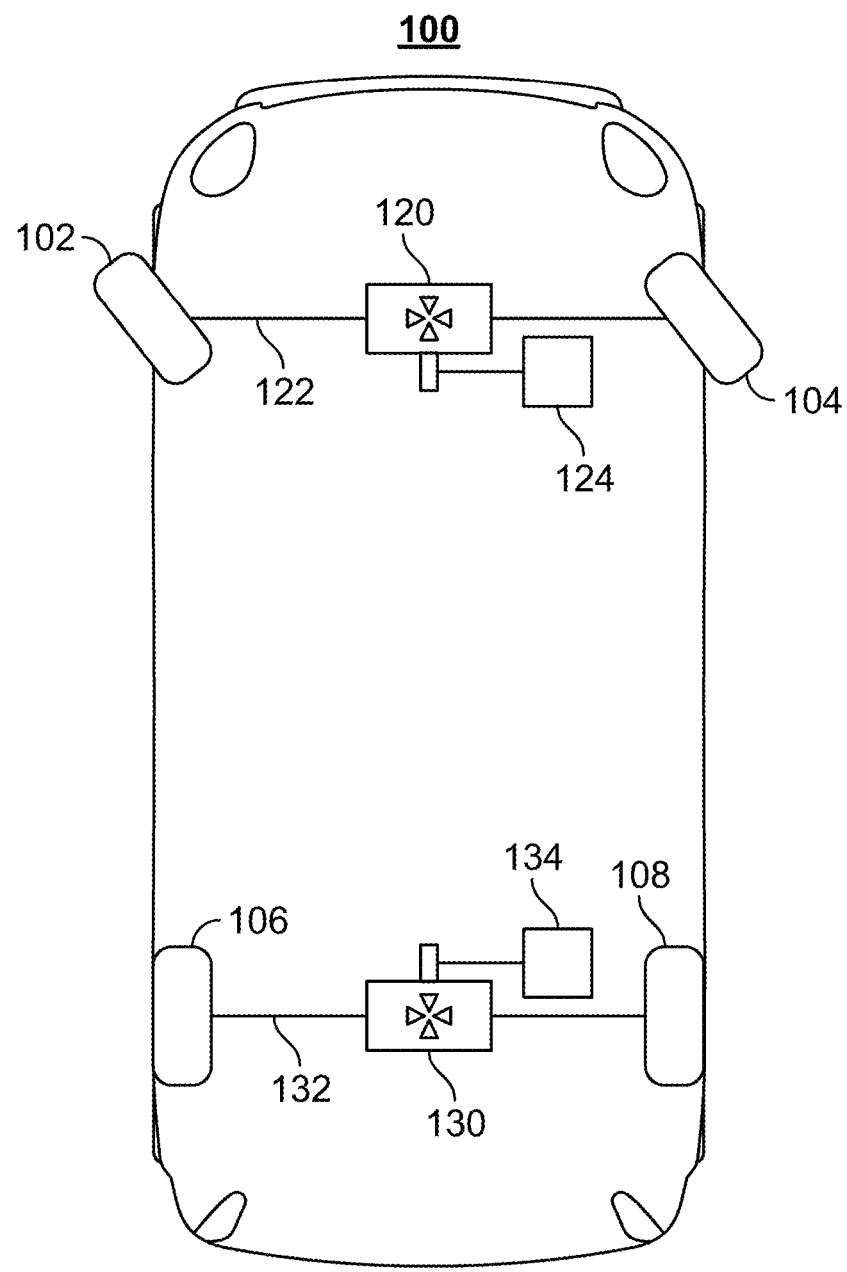
FIG. 1 shows a top view of an illustrative vehicle in accordance with some embodiments of the present disclosure.

FIG. 1 shows a top view of an illustrative vehicle 100 in accordance with some embodiments of the present disclosure. In some embodiments, vehicle 100 may be a coupe, a sedan, a truck, a bus, or any other type of vehicle.

In some embodiments, vehicle 100 may include a front left wheel 102, front right wheel 104, back left wheel 106, and back right wheel 108. In some embodiments, front left wheel 102 and front right wheel 104 may be connected via drive shaft 122. In some embodiments, drive shaft 122 may include a differential 120 (e.g., a locking differential). In some embodiments, vehicle 100 may include motor 124. Motor 124 may be connected to drive shaft 122 (e.g., via a belt, chains, gears, or any other connection device). In some embodiments, motor 124 may be configured to provide backwards and forward torque to drive shaft 122.

In some embodiments, back left wheel 102 and back right wheel 104 may be connected via drive shaft 132. In some embodiments, drive shaft 132 may include a differential 130 (e.g., a locking differential). In some embodiments, vehicle 100 may include a motor 134. Motor 134 may be connected to drive shaft 132 (e.g., via a belt, chains, gears, or any other connection device). In some embodiments, motor 134 may be configured to provide backwards and forward torque to drive shaft 132.

In some embodiments, motors 124 and 134 may be any kind of motors capable of generating power (e.g., gas motors, electric motors). In some embodiments, motors 124 and 134 may be devices connected to a primary single motor (not shown) and configured to independently transfer power from a single motor to drive shaft 122 and drive shaft 132, respectively.

In some embodiments, vehicle 100 may comprise processing circuitry. In some embodiments, the processing circuitry may comprise an on-board vehicle computer that is capable of controlling multiple features or capabilities of the vehicle. In some embodiments, processing circuitry may be communicatively connected with user inputs of the vehicle, sensors of the vehicle, and transitory or non-transitory memory (e.g., memory-storing institutions for operating the vehicle).

In some embodiments, vehicle 100 may include a plurality of sensors. For example, some of the plurality of sensors may include sensors for determining the speed of vehicle 100, the degree to which the front wheels 102, 104 of the vehicle are turned, and whether either one of differentials 120, 130 is opened or closed.

In some embodiments, the processing circuitry of vehicle 100 may be capable of directly controlling features of vehicle 100 with or without user input. For example, control circuitry may be able to open and close differentials 120, 130. In another example, control circuitry may be able to actuate motor 124 to provide a specified amount of backwards or forward torque to front drive shaft 122. In another example, control circuitry may be able to actuate motor 134 to provide a specified amount of backwards or forward torque to back drive shaft 132.

In some embodiments, vehicle 100 may operate in front dig mode during a turn. A left turn is depicted by FIG. 1, however those skilled in the art will recognize that similar techniques can be used to perform a right turn.

In some embodiments, the processing circuitry of vehicle 100 may engage the front dig mode when certain conditions are met. For example, a user may press a button or turn a lever to request the front dig mode. In some embodiments, instead of, or in addition to the user request, the processing circuitry may measure the speed of the vehicle and determine how far front wheels 102 and 104 are turned. In some embodiments, the front dig mode is activated when the speed of vehicle 100 is below a threshold (e.g., 5 miles per hour), and when at least one of wheels 102 and 104 is turned more than a certain angle (e.g., more than 40%). In some embodiments, the user may explicitly request the front dig mode (e.g., by pressing a front dig button), but the front dig mode will be activated by the processing circuitry only when the aforementioned speed and wheel turn criteria are met.

In some embodiments, while operating in front dig mode, the processing circuitry of vehicle 100 may provide forward torque to front wheels 102, 104 (e.g., by providing front torque to drive shaft 122) using motor 124. In some embodiments, the processing circuitry may also apply resistance to forward rotation of the inner back wheel (e.g., wheel 106) of vehicle 100. For example, the processing circuitry may apply a brake to the inner back wheel (e.g., wheel 106) of vehicle 100. In some embodiments, the processing circuitry may also provide forward torque to the outer back wheel (e.g., wheel 108), for example by providing front torque to drive shaft 132 using motor 134. In some embodiments, the processing circuitry may check whether differential 130 is open. If not, the processing circuitry may open differential 130.

Figure 2:
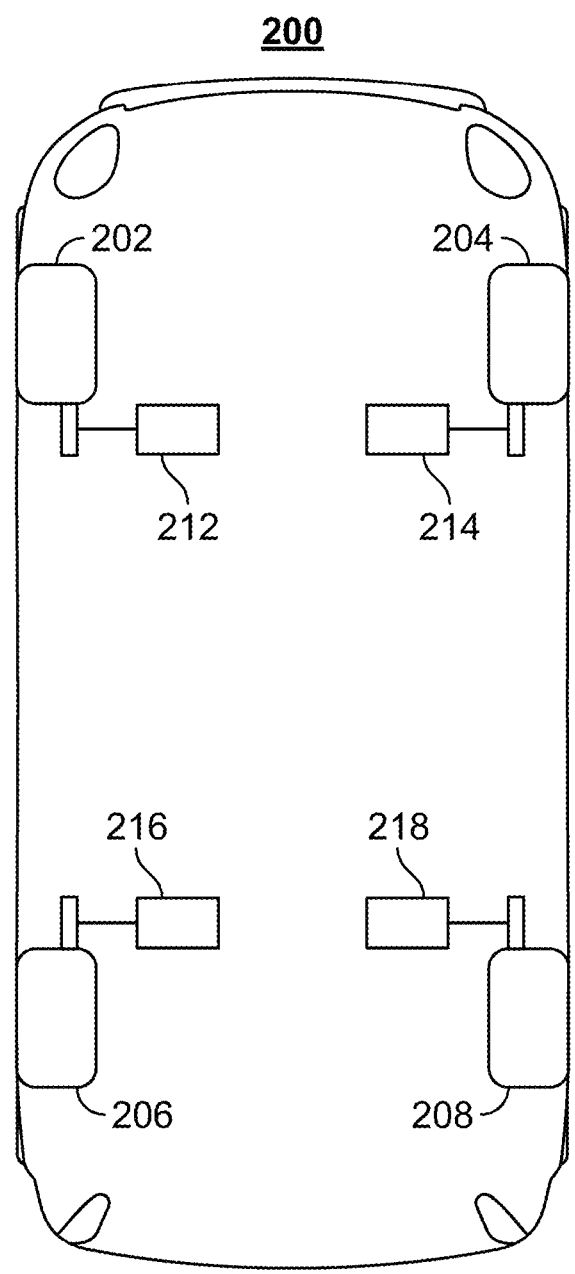
FIG. 2 shows another top view of an illustrative vehicle in accordance with some embodiments of the present disclosure.

FIG. 2 shows a top view of an illustrative vehicle 200 in accordance with some embodiments of the present disclosure. In some embodiments, vehicle 200 may be a coupe, a sedan, a truck, a bus, or any other type of vehicle.

In some embodiments, vehicle 200 may include a front left wheel 202, front right wheel 204, back left wheel 206, and back right wheel 208. In some embodiments, vehicle 200 may include a motor 212. Motor 212 may be connected to wheel 202 (e.g., via a belt, chains, gears, or any other connection device). Vehicle 200 may also include motors 214, 216, 218 which are similarly connected to wheels 204, 206, 208, respectively. In some embodiments, motors 212, 214, 216, and 218 may be configured to provide forward or backwards torque to their respective wheels 202, 204, 206, and 208.

In some embodiments, motors 212, 214, 216, and 218 may be any kind of motors capable of generating power (e.g., gas motors, electric motors). In some embodiments, motors 212, 214, 216, and 218 may be devices connected to a primary single motor (not shown) and configured to independently transfer power from a single motor to wheels 202, 204, 206, and 208, respectively.

In some embodiments, vehicle 200 may comprise processing circuitry. In some embodiments, the processing circuitry may comprise an on-board vehicle computer that is capable of controlling multiple features or capabilities of the vehicles. In some embodiments, processing circuitry may be communicatively connected with user inputs of the vehicle, sensors of the vehicle, and transitory or non-transitory memory (e.g., memory that stores institutions for operating the vehicle).

In some embodiments, vehicle 200 may include a plurality of sensors. For example, some of the plurality of sensors may include sensors for determining speed of vehicle 200, and the degree to which the front wheels 202, 204 of vehicle 200 are turned.

In some embodiments, the processing circuitry of vehicle 200 may be capable of directly controlling features of vehicle 200 with or without user input. In another example, control circuitry may be able to actuate motor 212 to provide a specified amount of backwards or forward torque to wheel 202. Similar, control circuitry may be able to actuate any of motors 214, 216, 218 to provide a specified amount of backwards or forward torque to wheels 204, 206, 208, respectively.

In some embodiments, vehicle 200 may operate in a front dig mode during a turn. A left turn is described herein, however those skilled in the art will recognize that similar techniques may be used to perform a right turn.

In some embodiments, the processing circuitry of vehicle 200 may engage the front dig mode when certain conditions are met. For example, a user may press a button or turn a lever to request the front dig mode. In some embodiments, instead, or in addition to the user request, the processing circuitry may measure the speed of the vehicle and determine the how far front wheels 202 and 204 are turned. In some embodiments, the front dig mode is activated when the speed of vehicle 100 is below a threshold (e.g., 7 miles per hour), and when at least one of wheels 202 and 204 is turned more than a certain angle (e.g., 35%).

In some embodiments, while operating in front dig mode, the processing circuitry of vehicle 200 may provide forward torque to front wheels 202, 204 (e.g., by using motors 212 and 214). In some embodiments, the processing circuitry may also apply resistance to forward rotation of the inner back wheel (e.g., wheel 206) of vehicle 200. For example, the processing circuitry may apply a brake to the inner back wheel (e.g., wheel 206) of vehicle 200. In some embodiments, the processing circuitry may apply backwards torque to the inner back wheel (e.g., wheel 206) of vehicle 200, for example by using motor 216. In some embodiments, the processing circuitry may also provide forward torque to the outer back wheel (e.g., wheel 208), for example by providing front torque using motor 218).

In some embodiments, vehicle 200 may operate in a tank-turn mode during a turn. A left turn is described herein, however those skilled in the art will recognize that a similar technique may be used to perform a right turn.

In some embodiments, the processing circuitry of vehicle 200 may engage the tank-turn mode when certain conditions are met. For example, a user may press a button, turn a lever, or turn the steering wheel to request the tank-turn mode. For example, the tank-turn mode may be activated from the front dig mode when the user turns the steering wheel even further.

In some embodiments, while operating in left tank-turn mode, the processing circuitry of vehicle 200 may provide forward torque to wheels 202, 208 (e.g., by using motors 212 and 218). In some embodiments, while operating in tank-turn mode, the processing circuitry of vehicle 200 may provide backwards torque to wheels 202, 206 (e.g., by using motors 212 and 216). As a result, vehicle 200 may rotate left with a very small turn radius.

Figure 3:
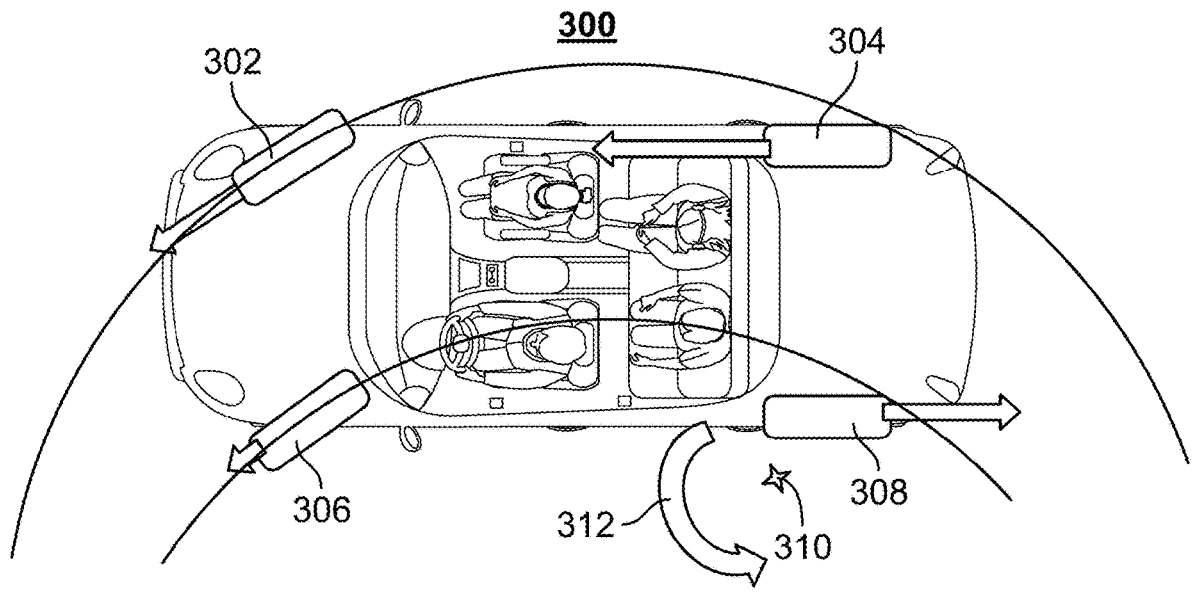
FIG. 3 shows another top view of an illustrative vehicle in accordance with some embodiments of the present disclosure.

FIG. 3 shows a top view of an illustrative vehicle 300 in accordance with some embodiments of the present disclosure. In some embodiments, vehicle 300 may be a coupe, a sedan, a truck, a bus, or any other type of vehicle. In some embodiments, vehicle 300 may be any one of vehicles 100 or 200.

In some embodiments, vehicle 300 is operating in a front dig mode. As shown, front wheels 302 and 306 are turned in the direction of a turn (e.g., left) and are being provided with forward torque. Right back wheel 304 is also being provided with forward torque. At the same time, resistance is provided to the inner back wheel 308. For example, a brake is applied to wheel 308. In some embodiments, wheel 308 is being provided with backward torque. As a result of resultant forces indicated by arrows, vehicle 300 turns around point 310 in a direction indicated by arrows 312.

Figure 4:
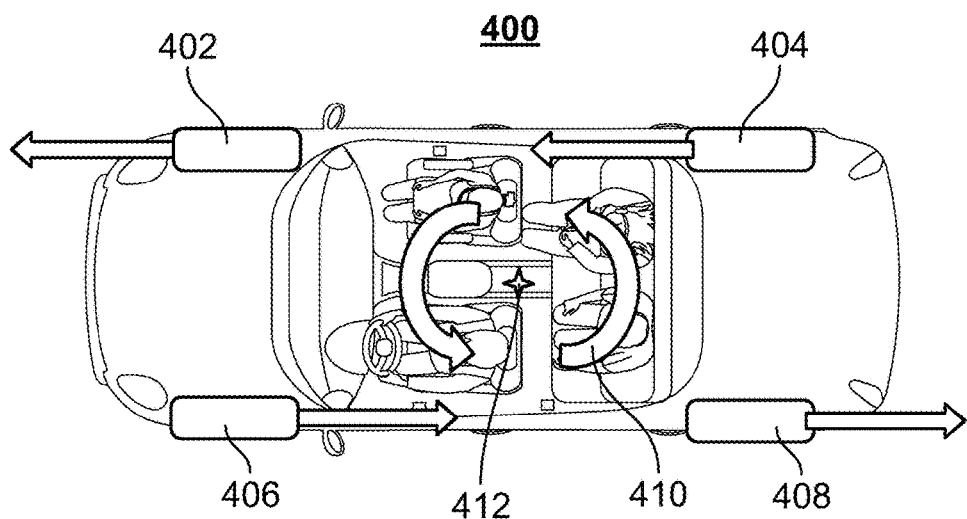
FIG. 4 shows yet another top view of an illustrative vehicle in accordance with some embodiments of the present disclosure.

FIG. 4 shows a top view of an illustrative vehicle 400 in accordance with some embodiments of the present disclosure. In some embodiments, vehicle 400 may be a coupe, a sedan, a truck, a bus, or any other type of vehicle. In some embodiments, vehicle 400 may be vehicle 100 or 200.

In some embodiments, vehicle 400 is operating in a left tank-turn mode. As shown, right wheels 402 and 404 are not turned (e.g., the wheels are kept straight) and are being provided with forward torque. At the same time, as shown, left wheels 406 and 408 are not turned (e.g., the wheels are kept straight) and are being provided with backwards torque. As a result of resultant forces indicated by arrows, vehicle 400 turns around point 412 (under vehicle 400) in a direction indicated by arrows 410.

In some embodiments, tank-turn mode may be activated by a user. For example, the user may activate the tank turn by interacting with a suitable button, a suitable switch, or a suitable digit user interface element (e.g., a button on a touchscreen interface of the vehicle. In some embodiments, the tank-turn mode may only be activated when all wheels of the vehicle are straight (i.e., aligned to be parallel to the length of the vehicle.) In some embodiments, the activation of the tank-turn mode will cause the vehicle to automatically strengthen the wheels. In some embodiments, when a user attempts to activate the tank-turn mode, the vehicle will prompt the user to straighten the wheels (e.g., via a visual reminder or auditory signal).

Figure 5:
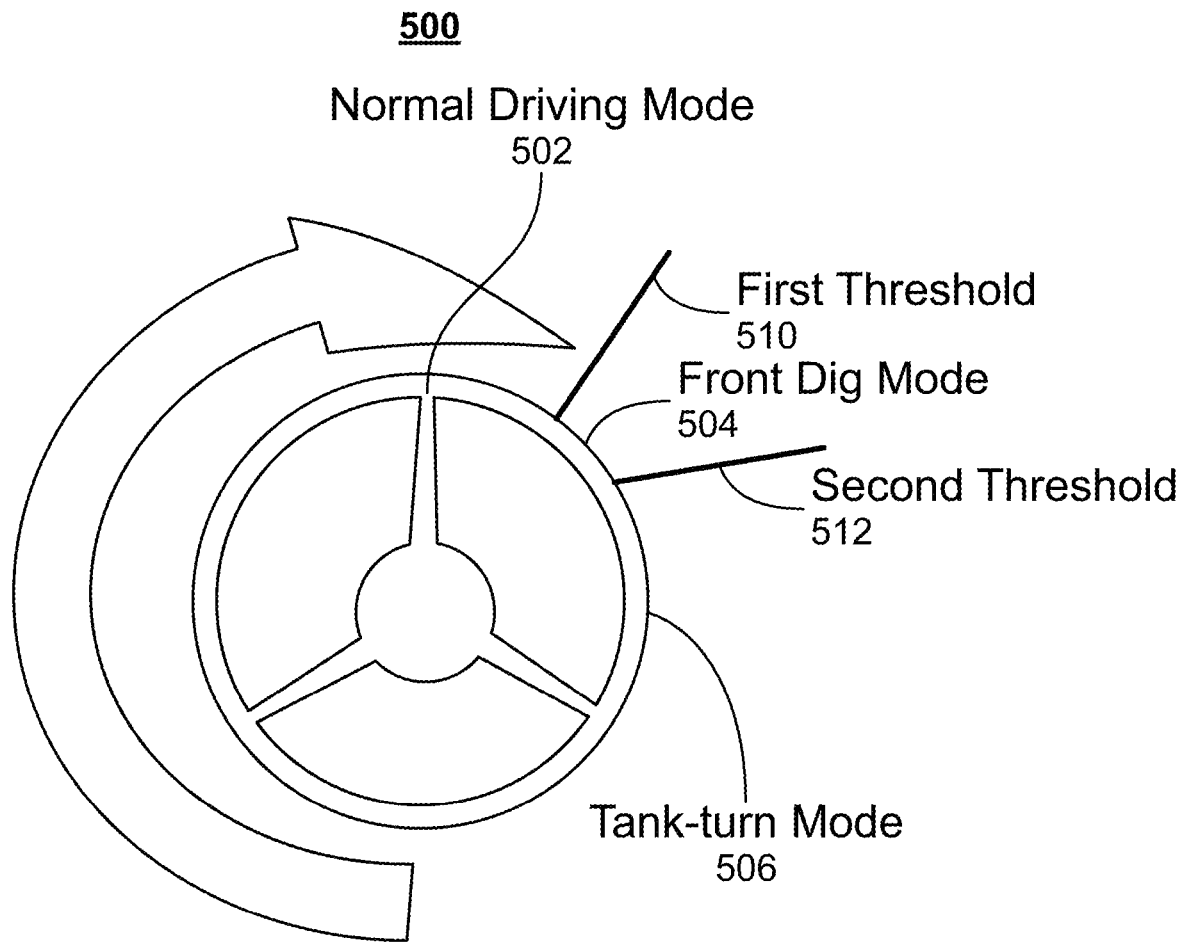
FIG. 5 depicts an illustrative front view of a steering wheel of a vehicle that is configured in accordance with some embodiments of the disclosure.

FIG. 5 shows a front view of an illustrative steering wheel 500 of a vehicle (e.g., vehicle 100 or 200) in accordance with some embodiments of the present disclosure.

In some embodiments, the rotation of steering wheel 500 can be used by the processing circuitry (e.g., the processing circuitry of vehicle 100 or 200) to enter front dig mode or tank-turn mode.

In some embodiments, steering wheel 500 may include first threshold 510 (e.g., 2 full revolutions). If the rotation of steering wheel 500 did not reach the first threshold, the vehicle may operate in a normal driving mode 502.

In some embodiments, first threshold 510 may have an associated false stop. For example, when the user rotates steering wheel 500 to first threshold 510, the user may experience resistance (e.g., provided by springs, a detent, or any other type of mechanism). In some embodiments, if the user rotates steering wheel 500 past first threshold 510 (e.g., by overcoming the false stop resistance), the processing circuitry may begin operating the vehicle in front dig mode 504.

In some embodiments, the steering wheel 500 may include second threshold 512 (e.g., 2.5 revolutions). In some embodiments, the second threshold 512 is optional, and the tank-turn mode may be activate using other techniques (e.g., as describe in relation to FIG. 4). For example, threshold 512 may be present in vehicles where steering wheel 500 is not mechanically connected to the wheels of the vehicle (e.g., in a drive-by-wire vehicle).

In embodiments where second threshold 512 is present, if the rotation of steering wheel 500 did not reach the second threshold, the vehicle may operate in front dig mode 504. In some embodiments, second threshold 512 may also have an associated false stop. For example, when the user rotates steering wheel 500 to second threshold 521, the user may experience resistance (e.g., provided by springs, a detent, or any other type of mechanism). In some embodiments, if the user rotates steering wheel 500 past second threshold 512 (e.g., by overcoming the false stop resistance), the processing circuitry may begin operating the vehicle in tank-turn mode 506.

In some embodiments, before entering the front dig mode the processing circuitry may cause the wheels of the vehicle to become straightened (e.g., become parallel to the length of the vehicle). For example, this may occur in response to steering wheel 500 being turned past second threshold 512. In some embodiments, when operating in front dig mode 504, the processing circuitry may apply resistance to the inner back wheel of the vehicle in proportion to how much steering wheel 500 is turned. For example, the further steering wheel 500 is turned, the higher amount of braking force may be applied to the inner back wheel. In some embodiments, there may be an intermediate threshold between threshold 510 and threshold 512. In some embodiments, when steering wheel 500 is turned past the intermediate threshold, the processing circuitry stop applying braking force to the inner back wheel and begin applying backwards torque to the inner back wheel (e.g., using motor 216 of FIG. 2).

It will be understood that during a non-skidding turn in the normal driving mode, the center of rotation is defined by the spatial arrangement of the wheels and the angles of the front wheels. As the steering wheel is turned further away from its center position, the center of rotation of the vehicle moves closer to the vehicle. The front dig mode enables the center of rotation to move closer to the vehicle than is possible by the angle of the front wheels alone. During the front dig mode, one or more tires of the vehicle will break its grip with ground, which enables the vehicle to obtain a smaller turn radius. In some embodiments, the amount the steering wheel is turned past the first threshold controls the position of the center of rotation. For example, the resistance to the inner back wheel of the vehicle can increase as the steering wheel is turned past the first threshold. In some embodiments, resistance is first increased by increasing the braking force applied and then further increased by releasing the braking force and applying backward torque to the rear inner wheel.

The position of the center of rotation in the front dig mode can also be controlled by varying the relative amount of torque applied to each of the front wheels and outer rear wheel.

In some embodiments, the amount the steering wheel is turned past the second threshold controls the position of the center of rotation. For example, when the steering wheel is turned passed the second threshold, backward torque may begin to be applied to the front inner wheel. The relative amount of backward torque on the inner wheels may increase relative to the amount of forward torque applied to the outer wheels as the amount the steering wheel is turned past the second threshold increase. When the steering wheel is turned to its maximum amount, the backward torque applied to the inner wheels may be approximately equal to the forward torque applied to the outer wheels.

The foregoing enables a driver to have accurate control of the center of rotation, and thus turn radius, in both the front dig mode and tank-turn mode.

Figure 6:
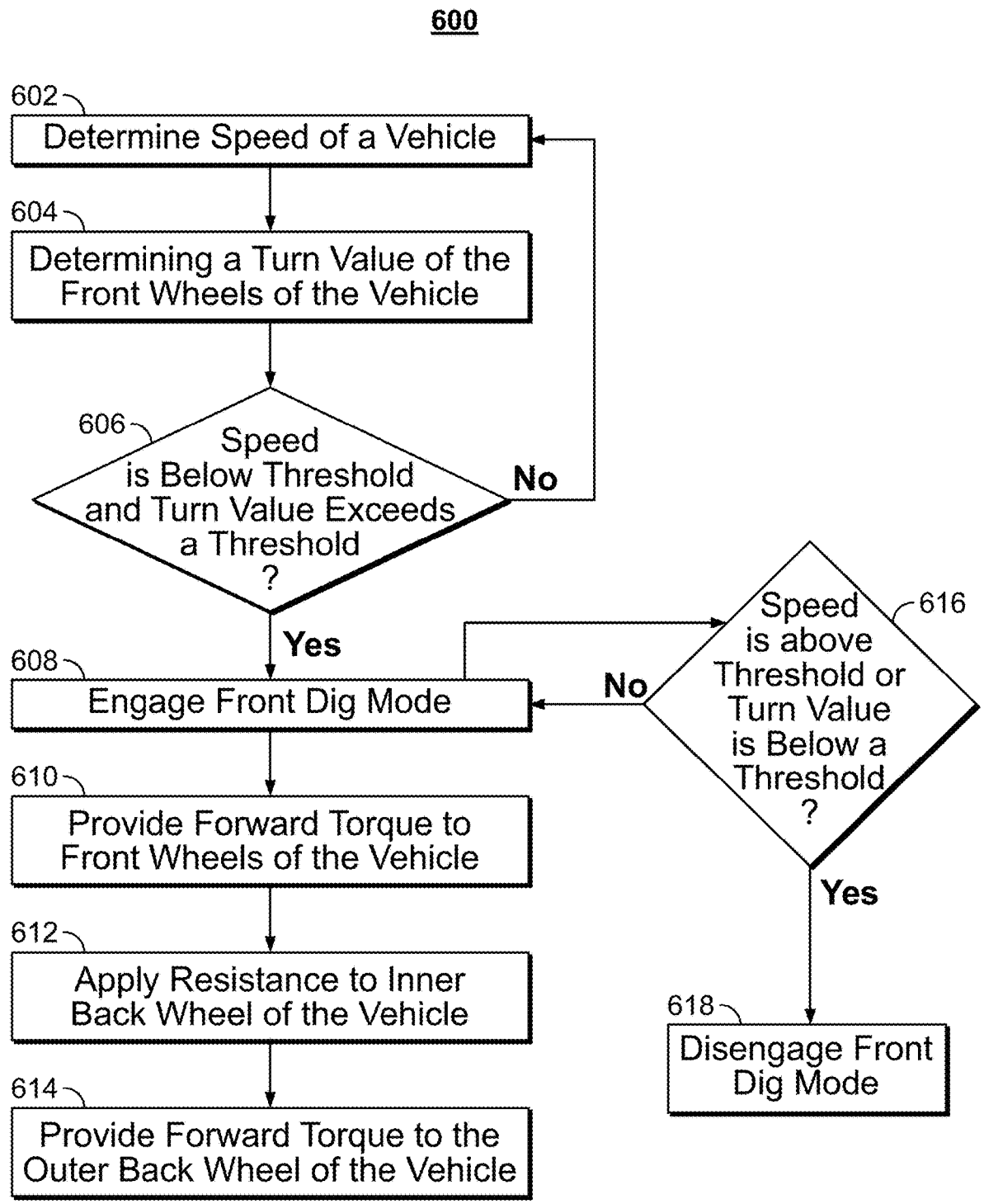
FIG. 6 depicts an illustrative flow diagram of a process for operating a vehicle, in accordance with some embodiments of the disclosure.

FIG. 6 depicts an illustrative flow diagram of a process 600 for operating a vehicle in several modes in accordance with several embodiments of the disclosure. In some embodiments, process 600 may be executed by processing circuitry of vehicle 100 (FIG. 1) or vehicle 200 (FIG. 2).

Process 600 begins at 602, where the processing circuitry determines the speed of a vehicle. For example, the processing circuitry may use a speedometer to obtain a current speed value.

Process 600 continues at 604 where the processing circuitry may determine a turn value of the front wheels of the vehicle (e.g., the turn angle of wheels 102 and 104 or wheels 202 and 204, or the amount a steering wheel has been turned). For example, the processing circuitry may use a gage connected to each of the front wheels and configured to provide a turn angle of each wheel. In some embodiments, the processing circuitry may determine the turn angle of the wheels based on how far the steering wheel of the vehicle is turned.

Process 600 continues at 606 where the processing circuitry may proceed depending on the outcomes of steps 602 and 604. For example, if the speed is below the speed threshold (e.g., 5 MPH), and if the turn angle of at least one front wheel is above a turn threshold (e.g., 40%), the processing circuitry may proceed to step 608. Otherwise, process 600 may return to step 602 and continue monitoring the speed of the vehicle and turn angles of the wheels of the vehicle.

At 608, the processing circuitry may engage the front dig mode. As part of the front dig mode, the processing circuitry may perform steps 610-614. Steps 610-614 may be performed in any order, or simultaneously.

At 610, the processing circuitry may provide forward torque to the front wheels of the vehicle. For example, the processing circuitry may actuate motor 124 to provide forward torque to drive shaft 122. In some embodiments, the processing circuitry may actuate motors 212 and 214 to provide forward torque to wheels 202 and 204.

At 612, the processing circuitry may apply resistance to the inner back wheel of the vehicle. For example, the processing circuitry may apply a brake to wheel 106 or to wheel 206. In some embodiments, the processing circuitry, may provide backward torque to wheel 206 using motor 216. In some embodiments, the amount of backwards torque may be proportional to how far the steering wheel of the vehicle is turned. For example, the further the steering wheel is turned, the more backward torque may be applied, which may further decrease the turn radius At 614, the processing circuitry may provide forward torque to the outer back wheel of the vehicle. For example, the processing circuitry may use motor 134 to provide forward torque to drive shaft 132 while keeping differential 130 open. In some embodiments, the processing circuitry may use motor 134 to provide forward torque to wheel 208. In some embodiments, the processing circuitry may provide forward torque to the outer back wheel of the vehicle a predetermined amount of time after providing forward torque to the front wheels of the vehicle.

In some embodiments, steps 610-614 may be adjusted based on user input. For example, the amount of torque provided to the front wheels of the vehicle and to the outer back wheel of the vehicle may be proportional to how far the user presses the gas pedal. In some embodiments, if the user stops pressing the gas pedal, the processing circuitry may stop providing torque to any of the wheels of the vehicle. As another example, the amount of resistance provided to the inner back wheel may vary based on how far the steering wheel is turned past a threshold.

At 616 the processing circuitry may determine that speed has increased past the speed threshold, or that the wheels are no longer turned to a point above the threshold. In these cases, the processing circuitry may proceed to step 618. Otherwise, the processing circuitry may maintain the front dig mode at 608. In some embodiments, additional or alternative checks can be performed to determine when to disengage front dig mode. For example, when the vehicle is on a relatively high friction surface, the front dig mode can be disengaged. A high friction surface can be identifying by monitoring wheel rotation and the amount of torque applied to the wheels. If a relatively high amount of torque is applied to the wheels and the wheels are not rotating, this may indicate a relatively high friction surface. In such a situation, the front dig mode can be disengaged to prevent tire and drivetrain wear.

At 618, the processing circuitry may disengage the front dig mode. For example, the processing circuitry may allow the user to drive the vehicle normally.

Figure 7:
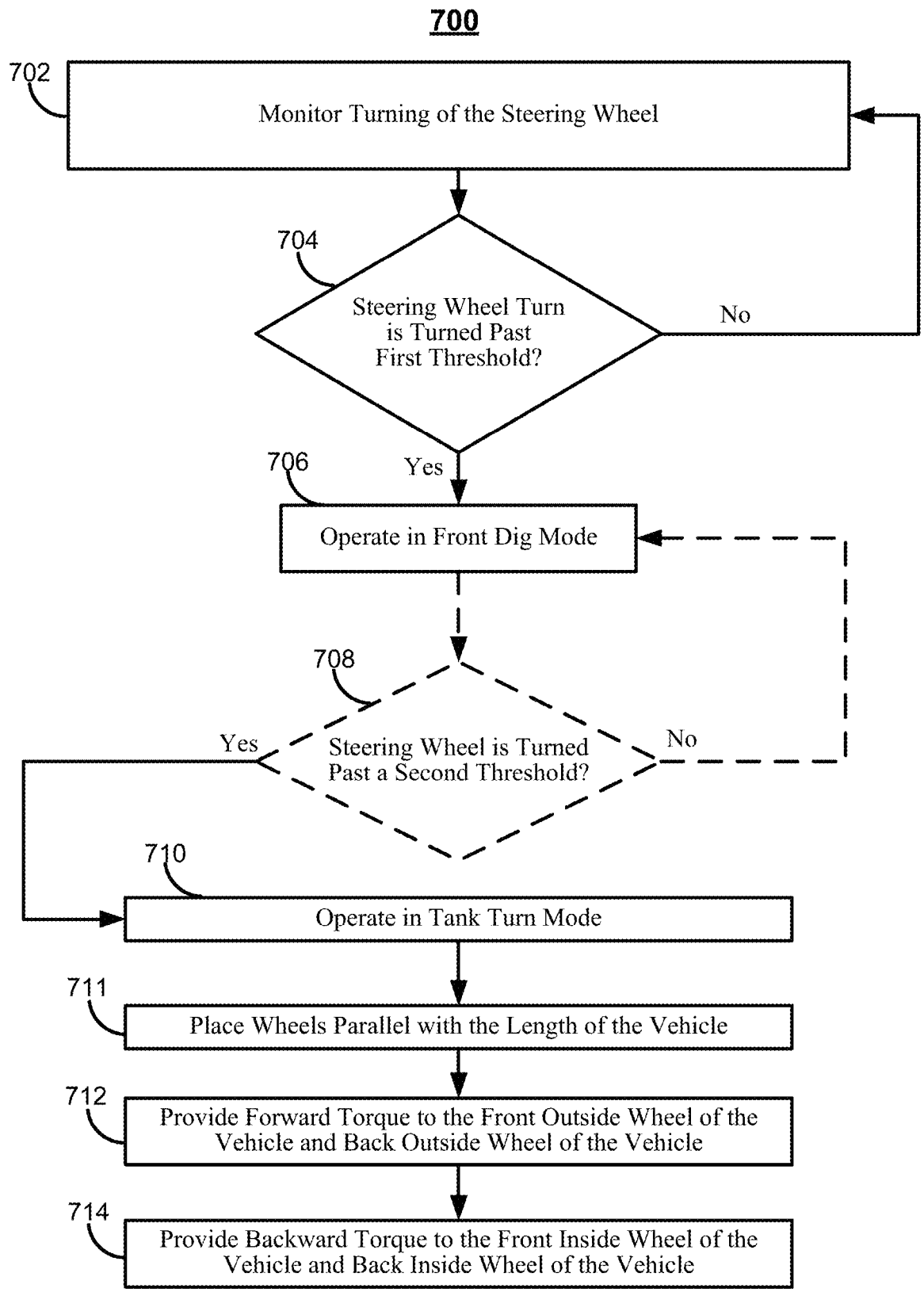
FIG. 7 depicts another illustrative flow diagram of a process for operating a vehicle, in accordance with some embodiments of the disclosure.

FIG. 7 depicts an illustrative flow diagram of a process 700 for operating a vehicle in several modes in accordance with several embodiments of the disclosure. In some embodiments, process 700 may be executed by processing circuitry of vehicle 200 (FIG. 2).

Process 700 begins at 702, where the processing circuitry may monitor the turning of the steering wheel (e.g., steering wheel 500). For example, the processing circuitry may determine how many steering wheel revolutions were performed by the user and in what direction.

Process 700 continues at 704, where the processing circuitry may determine whether the steering wheel is turned past a first threshold (e.g., more than 2.5 revolutions). In some embodiments, the first threshold may be threshold 510 of FIG. 5. In some embodiments, the processing circuitry may proceed to 706 if the steering wheel is turned past a first threshold. In some embodiments, the processing circuitry may proceed back to 702, when the steering wheel is not turned past first threshold.

At 706, the processing circuitry may operate the vehicle in the front dig mode, for example, as described with regard to steps 608-614 of FIG. 6. In some embodiments, the processing circuitry may disengage from the front dig mode when the steering wheel is turned to be below the first threshold. In some embodiments, the car may then be operated in a normal driving mode.

In some embodiments, step 708 may be optionally performed. For example, step 708 may be performed by a processing circuitry of a vehicles that allow the drive to enter tank-turn by rotating the steering wheel. In some embodiments, steps 710-714 may be performed independently of steps 702-708. For example, tank-turn mode operation in step 710 may be initiated by a user pressing a suitable button or a switch (e.g., as described in relation to FIG. 4).

At 708, while operating in the front dig mode the processing circuitry may determine whether the steering wheel is turned past a second threshold (e.g., more than 3 revolutions). In some embodiments, the second threshold may be threshold 512 of FIG. 5. If so, the processing circuitry may proceed to step 710. Otherwise, the processing circuitry may proceed back to 706 and continue operating in front dig mode.

At 710, the processing circuitry may operate the vehicle in tank-turn mode. For example, the processing circuitry may perform steps 711-714. These steps may be performed in any order or simultaneously.

In some embodiments, at 711, the processing circuitry may place wheels of the vehicles parallel with the length of the vehicle (e.g., by automatically turning the wheels.) In some embodiments, step 711 may be skipped. For example, the wheels may already be placed in the straight positions and this no action may be needed. In some embodiments, the processing circuitry may request that the user manually place the wheels in the straight position (e.g., by voice prompt and/or by displaying a prompt on a screen).

At 712, the processing circuitry may provide forward torque to the front outside wheel of the vehicle and back outside wheel of the vehicle. For example, the processing circuitry may use motors 214 and 218 to rotate wheels 204 and 208 forward. In some embodiments, the processing circuitry may use motors 212 and 216 to rotate wheels 202 and 206 backwards. In some embodiments, the processing circuitry may disengage from tank-turn mode when the steering wheel is turned to be below the second threshold. In some embodiments, the car may then be operated in front dig mode or in normal driving mode.

It is contemplated that the steps or descriptions of each of FIGS. 4-7 may be used with any other embodiment of this disclosure. It is contemplated that some steps or descriptions of each of FIGS. 4-7 may be optional and may be omitted in some embodiments. In addition, the steps and descriptions described in relation to FIGS. 4-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one or more of the steps in FIGS. 6-7.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within any one vehicle 100 or 200.

The processes discussed above in connection with FIGS. 6-7 are intended to be illustrative and not limiting. One skilled in the art would appreciate that the steps of the processes in FIGS. 6-7 discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A vehicle, comprising:
a first motor coupled to a front wheel;
a second motor configured to apply torque to a rear wheel to propel the vehicle; and
circuitry configured to turn the vehicle by:
determining whether speed of the vehicle is below a speed threshold; and
in response to determining the speed is below the speed threshold:
actuating the first motor to provide torque to the front wheel in a first direction; and
actuating the second motor to provide torque to the rear wheel in a second direction opposite the first direction.

2. The vehicle of claim 1, wherein the first direction is forward and the second direction is backward.

3. The vehicle of claim 1, wherein the first direction is backward and the second direction is forward.

4. The vehicle of claim 1, wherein the front wheel is on a first side of the vehicle and the rear wheel is on a second side of the vehicle opposite the first side.

5. The vehicle of claim 1, wherein actuating the first motor to provide torque to the front wheel in the first direction and actuating the second motor to provide torque to the rear wheel in the second direction causes the vehicle to rotate.

6. The vehicle of claim 1, further comprising a pedal,
wherein the torque provided to the front wheel and the rear wheel is proportional to how far the pedal is pressed.

7. The vehicle of claim 1, wherein:
the front wheel is one of two front wheels;
the first motor is coupled to the two front wheels of the vehicle; and
actuating the first motor to provide forward torque to the front wheel comprises actuating the first motor to provide forward torque to the two front wheels.

8. The vehicle of claim 7, further comprising a front drive shaft that couples the first motor to the two front wheels.

9. The vehicle of claim 8, wherein the front drive shaft comprises a differential.

10. A method for turning a vehicle, the method comprising:
   determining whether speed of the vehicle is below a speed threshold; and
   in response to determining the speed is below the speed threshold:
      providing, by a first motor, torque to a front wheel of the vehicle in a first direction; and
      providing, by a second motor configured to apply torque to propel the vehicle, torque to a rear wheel of the vehicle in a second direction opposite the first direction.

11. The method of claim 10, wherein the first direction is forward and the second direction is backward.

12. The method of claim 10, wherein the first direction is backward and the second direction is forward.

13. The method of claim 10, wherein the front wheel is on a first side of the vehicle and the rear wheel is on a second side of the vehicle opposite the first side.

14. The method of claim 10, wherein the torque provided to the front wheel and the rear wheel is proportional to how far a pedal of the vehicle is pressed.

15. A system for turning a vehicle in a turning mode, the system comprising:
   circuitry configured to:
      determine whether speed of the vehicle is below a speed threshold;
      in response to determining the speed is below the speed threshold, activate the turning mode; and
      in response to activating the turning mode:
         provide, by a first motor, torque to a front wheel of the vehicle in a first direction; and
         provide, by a second motor configured to apply torque to a rear wheel of the vehicle to propel the vehicle, torque to the rear wheel in a second direction opposite the first direction.

16. The system of claim 15, wherein the circuitry is configured to activate the turning mode in response to receiving a selection of the turning mode among a tank-turn mode and a front-dig mode.

17. The system of claim 15, wherein the first direction is forward and the second direction is backward.

18. The system of claim 15, wherein the first direction is backward and the second direction is forward.

19. The system of claim 15, wherein the front wheel is on a first side of the vehicle and the rear wheel is on a second side of the vehicle opposite the first side.

20. The system of claim 15, wherein:
   when providing torque to the front wheel, the circuitry is configured to provide torque to a front drive shaft of the vehicle by the first motor configured to transmit torque to the front drive shaft of the vehicle; and
   when providing torque to the rear wheel, the circuitry is configured to provide torque to a rear drive shaft of the vehicle by the second motor configured to transmit torque to the rear drive shaft of the vehicle.

* * * * *